United States Patent [19]
Grauer

[11] 3,773,291
[45] Nov. 20, 1973

[54] BALL VALVES

[75] Inventor: Oscar H. Grauer, Warminster, Pa.

[73] Assignee: Fischer & Porter Company, Warminster, Pa.

[22] Filed: Mar. 30, 1970

[21] Appl. No.: 23,917

[52] U.S. Cl................................ 251/315, 251/209
[51] Int. Cl.............................................. F16k 5/06
[58] Field of Search.................... 251/315, 209, 208, 251/368, 148, 172, 185, 298, 309; 137/625.3

[56] References Cited
UNITED STATES PATENTS

| | | | |
|---|---|---|---|
| 3,036,600 | 5/1962 | Vickery | 251/172 X |
| 3,248,080 | 4/1966 | Plasko | 251/185 |
| 3,314,643 | 4/1967 | Sachnik | 251/309 |
| 3,379,408 | 4/1968 | Lowrey | 251/298 |
| 3,520,513 | 4/1970 | Okerblom | 251/298 X |
| 1,080,892 | 12/1913 | Chandler | 251/315 X |
| 2,985,191 | 5/1961 | Beckett et al. | 251/315 X |
| 3,148,695 | 9/1964 | Groen et al. | 251/315 X |
| 3,503,415 | 3/1970 | De Angelis et al. | 251/315 X |
| 565,730 | 8/1896 | Foote | 251/309 |
| 2,510,514 | 6/1950 | Mueller | 251/209 |
| 2,222,675 | 11/1940 | Lynger | 251/209 X |
| 3,403,887 | 10/1968 | Myers | 251/209 |
| 3,409,268 | 11/1968 | Gachot | 251/148 |
| 2,926,885 | 3/1960 | Szulc et al. | 251/368 |
| 3,191,906 | 6/1965 | Zeigler et al. | 251/208 |
| 3,456,916 | 7/1969 | Ytzen et al. | 251/315 X |
| 3,536,296 | 10/1970 | Burris | 251/208 |

FOREIGN PATENTS OR APPLICATIONS

| | | | |
|---|---|---|---|
| 637,261 | 5/1950 | Great Britain | 251/209 |
| 753,510 | 10/1950 | Germany | 251/309 |
| 548,831 | 10/1956 | Italy | 251/309 |

Primary Examiner—Henry T. Klinksiek
Attorney—Leonard L. Kalish

[57] ABSTRACT

A flow-control glass ball-valve including a glass valve-housing having a valve-chamber therein and an inlet thereto and an outlet therefrom opposite each other, a trunnion-free or pivotless glass valve-ball having a fluid passageway therethrough whose ends operatively register with the inlet and outlet, respectively, when the valve-ball is in its fully open position, said valve-ball being rotatably supported within said chamber without contact with the walls thereof by two circular ball-mounting sealing-rings of Teflon or the like mounted in the valve-housing in operative juxtaposition to the inlet and outlet, respectively, and each ring supportingly contacting a spherical surface of the valve-ball along substantially more than half circle in all positions of the valve-ball about its rotation axis, a ball-turning valve-stem extending through and sealedly journalled in the valve-housing with its axis generally at a right angle to the axis of the inlet and outlet and having a loose operative interconnection with the valve-ball for rotating it about an axis generally at a right angle to the axis of the inlet and outlet and generally limiting its rotation to rotation about said axis, and generally cardioid-shaped radially-extending intersecting flow-affecting edges at an end of said passageway, said intersecting edges being in proximity of the diametral plane of the valve-ball which is generally at a right angle to its axis of rotation and in which the axes of the inlet and outlet lie.

16 Claims, 11 Drawing Figures

United States Patent [19]
Grauer
[11] 3,773,291
[45] Nov. 20, 1973
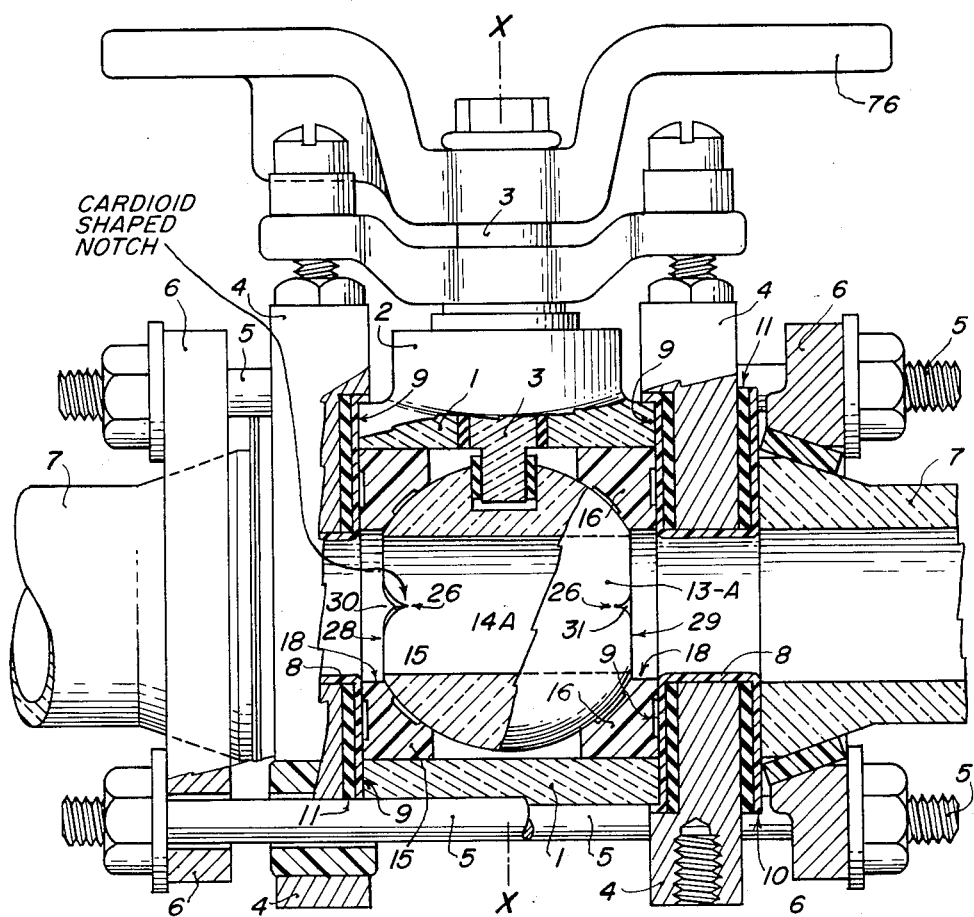

INVENTOR.
OSCAR H. GRAUER
BY Leonard L. Kalish
ATTORNEY

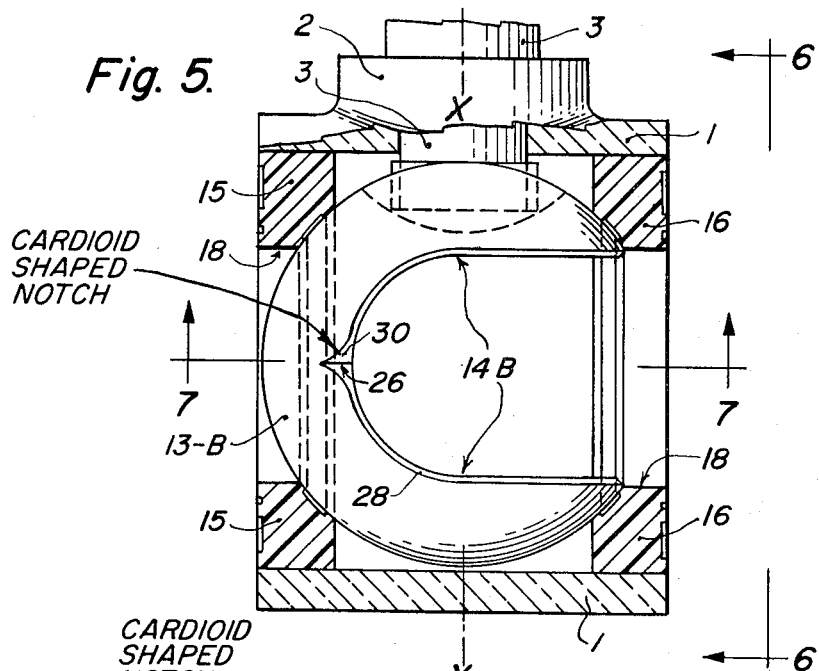
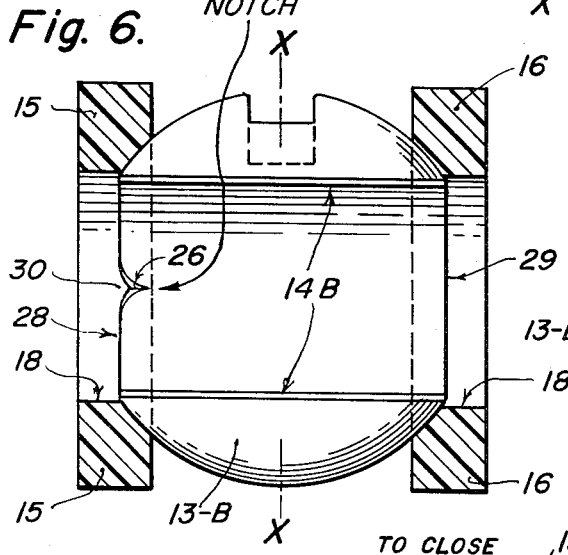
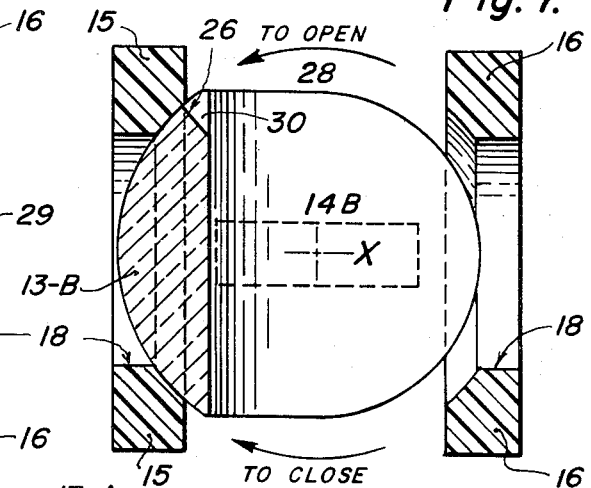
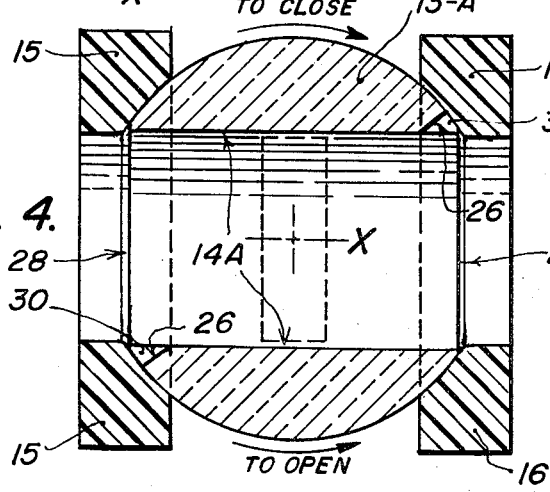

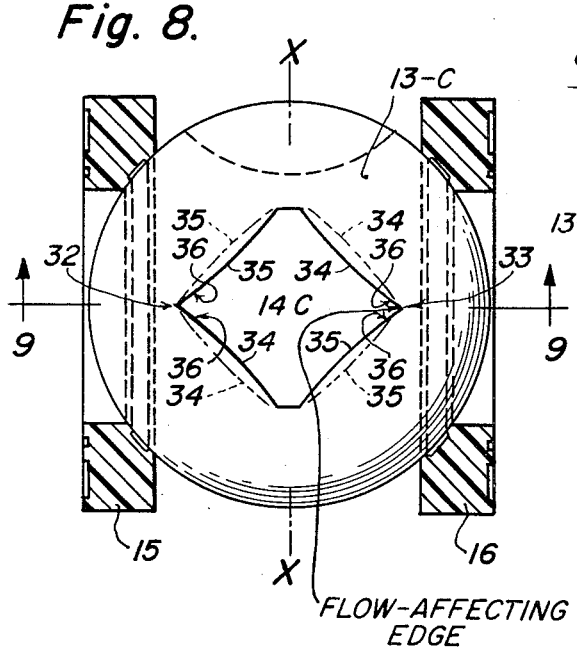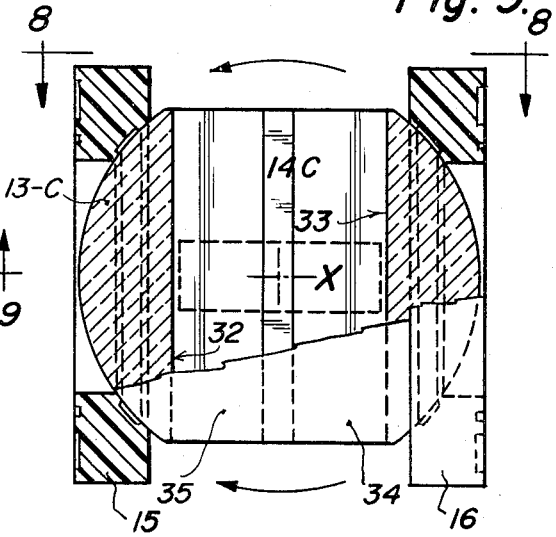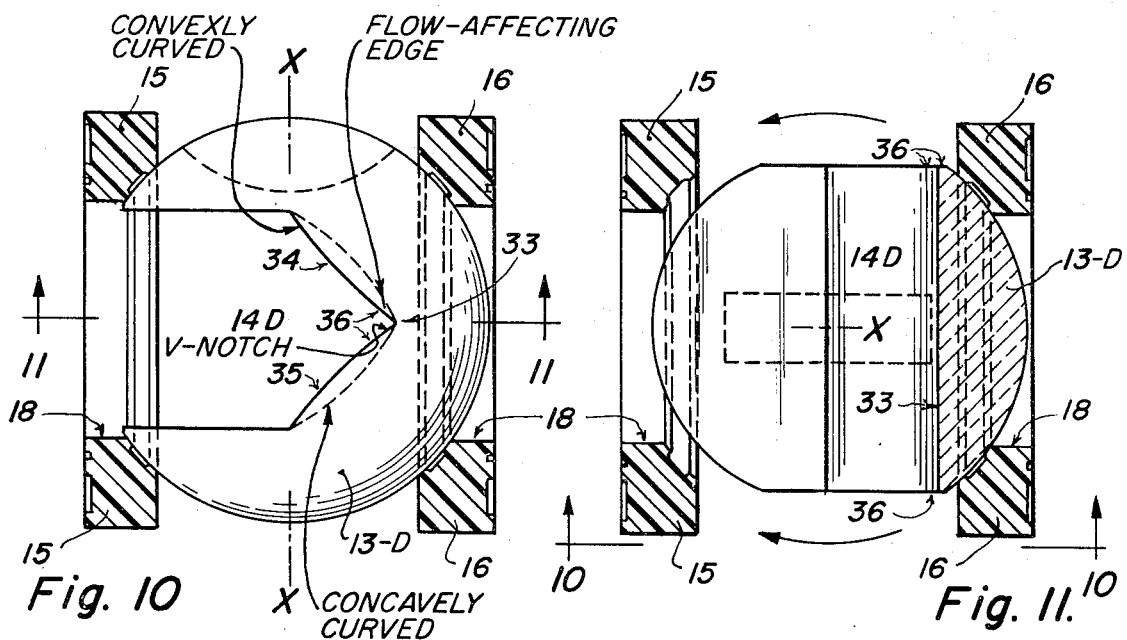

BALL VALVES

THE FIELD OF THE INVENTION

The present invention relates to ball valves of the type disclosed in U.S. Pat. No. 3,503,415 issued Mar. 31, 1970 on co-pending U.S. Pat. application Ser. No. 556,071 filed June 8, 1966 and in U.S. Pat. No. 3,547,403 issued Dec. 15. 1970 on co-pending application Ser. No. 790,362 filed Jan. 10, 1969, in which a rotatable valve-ball is operatively mounted within the valve-chamber of a generally tubular valve-housing out of contact with the walls of the valve-chamber, by two ball-mounting sealing-rings within the valve-housing in operative juxtaposition to the inlet and outlet thereof, respectively, and two stationary end-members at and the extending transversly across the ends of the valve-housing, at least one of which is detachably secured to the valve-housing, and in which the two end-members press the ball-mounting sealing-rings against the valve-ball.

THE OBJECTS OF THE INVENTION

Among the objects of the present invention is a ball-valve which will have a lesser tendency to become clogged or to have its closing obstructed by fluid-entrained solid particles and which will permit a better fine-incremental throttling at the lower flow rates as the valve-ball approaches its fully closed position, and which will not tend to turn by itself in the closing direction under the influence of a high-velocity flow-stream when the ball-valve thereof approaches its closed position.

THE PRIOR-ART

The prior-art is represented by the prior ball-valve patents cited in the aforementioned U.S. Pat. Nos. 3,503,415 and 3,547,403 issued on co-pending applications Ser. Nos. 556,071 & 790,362, respectively, and by U.S. Pat. Nos. 1,076,802, 2,883,147, 3,191,906 & 3,446,477 and French Pat. No. 831,862, which latter five patents disclose valves including a spherically-surfaced movable valve-element whose spherical surface is substantially less than half a sphere and which is fixedly pivoted by a pivot-shaft or by trunnions and which derives its support either from a pivot-shaft or trunnions or from contact with the spherical wall of the valve-chamber.

SUMMARY OF THE INVENTION

According to one embodiment of my present invention, I either provide two diametrically opposite generally V-shaped or cardioid shaped notches in or across the two opposite lips of the cylindrical fluid passageway which extends through a trunnion-free valve-ball supported only by opposite ball mounting and sealing Teflon rings, each notch so located that it will be generally bisected by the diametral plane of the valve-ball which is at a right angle to its axis of rotation, or the fluid passageway itself is made of a polygonal cross-section whose two opposite apex-lines lie in the aforementioned diametral plane, or the fluid-passageway may be open on one side, with one such notch in one of the lips of the passageway, in the aforementioned diametral plane. In the ball-valve of the present invention the ball-valve is supported only by two circular ball mounting and sealing rings each of which makes a circular sealing and mounting contact with the valve-ball along substantially more than a half circle in all positions thereof.

BRIEF DESCRIPTION OF THE DRAWINGS

FIG. 4 represents a cross-sectional view similar to FIG. 3, but with the valve-ball turned 90°, to its open position.

FIG. 5 represents a cross-sectional view of the valve-housing and a view of a valve-ball therein similar to that shown in FIGS. 1 to 4, but in which one side of the passageway through the valve-ball is entirely open; and showing the valve-ball in its closed position.

FIG. 6 represents the valve-ball shown in FIG. 7, and its mounting-and-sealing rings, as viewed in line 6—6 of FIG. 5, but showing the valve-ball in its open position.

FIG. 7 represents a cross-sectional view on line 7—7 of FIG. 5, showing the valve-ball in its closed position.

FIG. 8 represents a view of a valve-ball (and its mounting-and-sealing rings) as viewed along the axis of the passageway therethrough or on line 8—8 of FIG. 9, similar to the valve-ball shown in FIG. 2, but representing another embodiment of my invention, namely, one in which the passageway is a four-sided (or other polygonally cross-sectioned hole), with two opposite apex-lines of two opposite sets of adjacent sides lying in the aforementioned diametral plane, showing the valve-ball in its closed position.

FIG. 9 represents a partial cross-sectional view on line 9—9 of FIG. 8, also showing the valve-ball in its closed position.

FIG. 10 represents a view of a valve-ball similar to that shown in FIG. 8 & 9, but in which one side of the through-passageway is entirely open, as viewed diametrically through its passageway or on line 10—10 of FIG. 1, and showing the valve-ball in its closed position.

FIG. 11 represents a cross-sectional view on line 11—11 of FIG. 10.

DESCRIPTION OF THE PREFERRED EMBODIMENTS OF THE INVENTION

Figure 1:
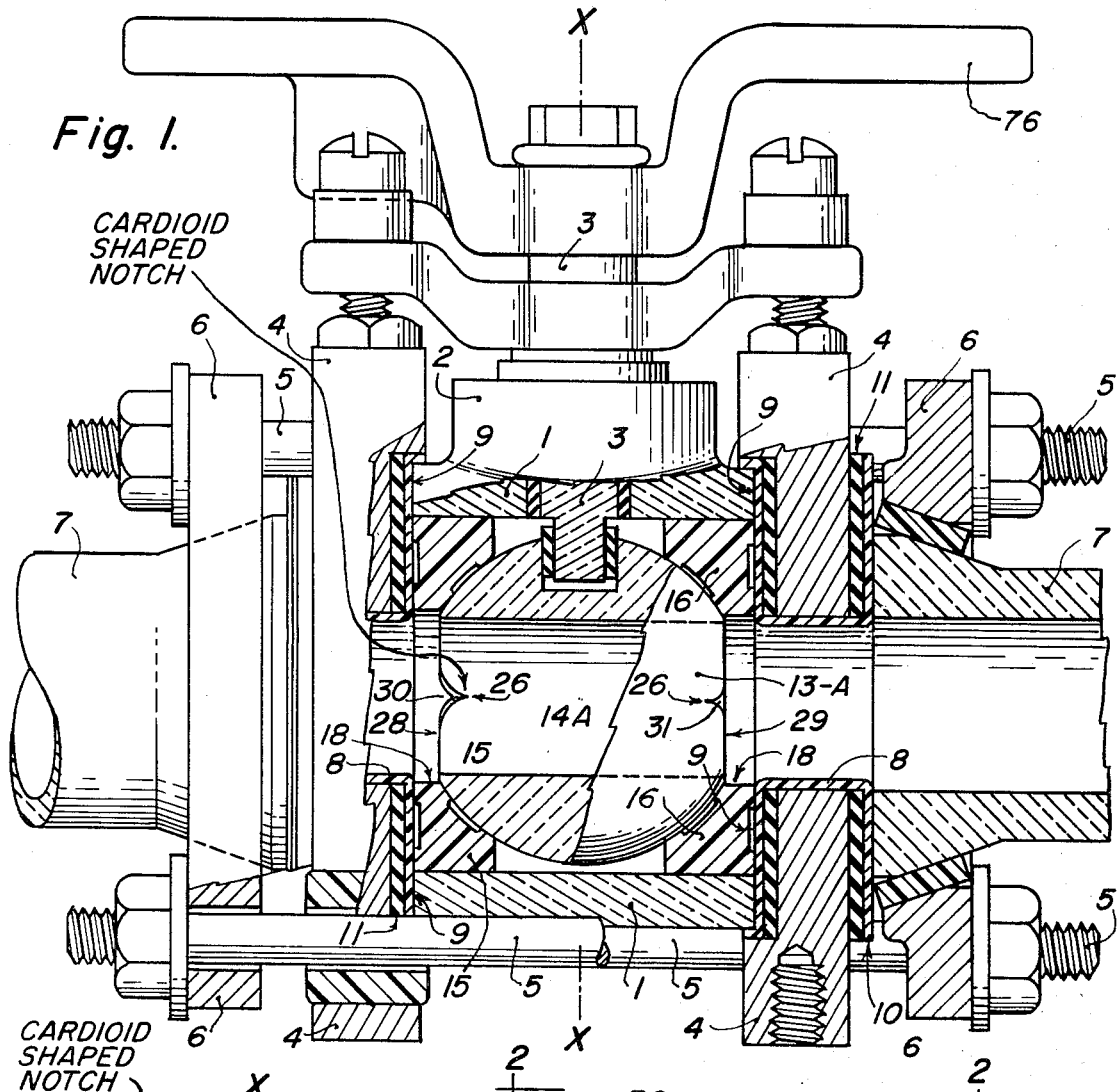
FIG. 1 represents a partially cross-sectional view of an embodiment of the ball-valve of the present invention, in which the valve-ball has a generally cylindrical fluid-passageway therethrough, with two diametrally opposite cardioid-shaped notches in or across the two opposite circular lips of the passageway, with each notch bisected into two generally equal halves by the diametral plane of the valve-ball which is at a right angle to its axis of rotation.
Figure 2:
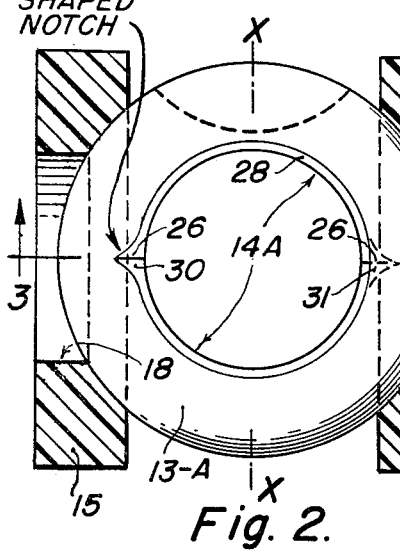
FIG. 2 represents a view of the valve-ball of FIG. 1, and its two mounting-and-sealing rings, viewed along the axis of the passageway therethrough or on line 2—2 of FIG. 3, with the valve-ball shown in its closed position.
Figure 3:
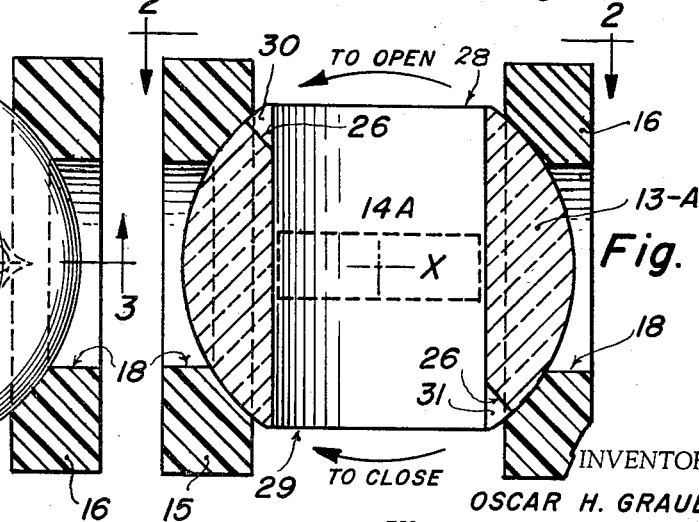
FIG. 3 represents a cross-sectional view on line 3—3 of FIG. 2, showing the valve-ball in its closed position.

The generally tubular valve-body or valve-housing 1 is preferably formed of boro-silicate glass or other essentially vitreous material or a ceramic material or a glass-ceramic composite, or is lined therewith, and has a cylindrical bore constituting a valve-chamber and is provided with a stem-mounting extension or bonnet 2 in which the valve-stem 3 is rotatably journalled or mounted in sealing rings and is suitably sealed against the passage of fluid under pressure in any conventional manner or in the manner shown in aforementioned U.S. Pat. No. 3,503,415 issued on co-pending U.S. Pat. application Ser. No. 556,071 filed June 8, 1966. At each end of the tubular housing 1, a closure member 4 is provided, made of steel or other metal or other non-frangible or impact-resistant material. The closure members 4 are pressed against the ends of the housing 1 by means of bolts 5 which extend through holes in the closure members 4 and through the pipe-coupling flanges 6 by which the glass pipes 7 are operatively mounted to the closure members 4.

A generally spool-shaped sealing member 8 of Teflon or the like, having inner sealing discs 9 and outer sealing discs 10, is operatively mounted to each closure member 4, in the manner indicated in FIG. 1, and resilient washers 11 of "Viton" or other suitable rubber-like or resilient plastic material are interposed between the sealing discs 9 & 10 of the spool-like sealing-members 8 and the corresponding faces of the closure members 4.

The valve-balls 13-A, 13-B, 13-C & 13-D are also preferably made of or coated with boro-silicate glass or other vitreous or ceramic material.

In the embodiment shown in FIGS. 1 to 4, a generally cylindrical fluid passageway 14A extends through the valve-ball 13-A, with its axis lying in a diameter of the valve-ball. The valve-ball 13-A is mounted in the cylindrical valve chamber constituted by the interior of the valve-housing 1, out of contact with the walls of such valve-chamber, only to two ball mounting and sealing rings 15 & 16 of Teflon or other suitable plastic having resiliency, cold flow and other characteristics of Teflon.

The ball-mounting and sealing rings 15 & 16 are preferably of the form and construction shown and described in aforementioned U.S. Pat. No. 3,547,403 issued on co-pending U.S. Pat. application Ser. No. 790,362 filed Jan. 10, 1969, as generally indicated in FIGS. 1 & 5 and 8 to 11, although they may be of the conventional form and construction indicated in FIGS. 2, 4, 6 & 7;— the present invention not being limited to the particular form or construction of the sealing rings 15 & 16. Of whatever form and construction, the ball mounting and sealing rings 15 & 16 form fluid seals with the closure members 4 or with the inner-sealing discs 9 thereof and form a fluid seal with the inner cylindrical wall of the valve-housing 1, and at least one of said rings forms a full-circular seal with the spherical surface of the valve-ball 13 when the latter is in its closed position indicated in FIGS. 2, 3, 5 & 7 to 11.

The various other features or details of the construction of the ball-valve which are not fully shown in the accompanying drawings nor expressly described herein, may be in accordance with corresponding details of construction shown and described in aforementioned U.S. Pat. No. 3,503,415 issued on co-pending U.S. Pat. application Ser. No. 556,071 filed June 8, 1966.

In the embodiment shown in FIGS. 1 to 4, inclusive, the fluid through-passageway 14A is generally cylindrical in cross-section with its axis at a right angle to its axis of rotation of the valve-ball 13-A indicated by the line X—X. When the valve-ball 13-A is in its open position shown in FIGS. 1 & 4, the circular ends or lips 28 & 29 of the passageway 14A are generally in registration or in operative alignment with the inlet or outlet of the valve-housing 1 constituted by the cylindrical passageways extending through the central cylindrical portions of the spool-shaped sealing members 8 or constituted by the central holes 18 in the ball mounting and sealing rings 15 and 16.

Generally V-shaped notches or grooves 31 & 31, preferably of cardioid shape, are extended across each of the two opposite lips 28 & 29 of the passageway 14A, with the apex-lines or apex-zones 26 of the grooves extending between points on the surface or passageway 14A substantially inwardly from the lips thereof and points on the spherical outer surface of the valve-ball at a substantial distance from said lips, as shown in FIGS. 1 to 4. The depth as well as the configuration of the grooves or channels may be varied according to the throttling characteristics desired. The two grooves or channels 30 & 31 in the opposite lips 28 & 29 of the passageway 14A are at diametrically opposite points on said lips, and each groove or channel 30 & 31 is preferably distributed equally on opposite sides of the diametral plane of the valve-ball which is at a right angle to its axis of rotation X—X.

As shown particularly in FIG. 1, the handle 76 is provided on the valve-stem 3, and the two suitable stops therefor, spaced approximately 90° apart, limit the rotation of the stem 3 and of the valve-ball 13-A to approximately 90° or to somewhat less than 90° between a fully open position and a fully closed position of the valve-ball, as indicated particularly in FIGS. 1, 5, 6 & 9 of U.S. Pat. No. 3,503,415 issued on aforementioned co-pending U.S. Pat. application Ser. No. 556,071.

The pair of diametrically opposite notches or grooves 30 & 31 not only provide fine-incremental throttling as the valve-ball approaches its closed position, but also tend to prevent or minimize clogging of the valve and the obstruction of the final closing turning of its valve-ball by solid particles entrained in the fluid passing through the valve, and also provide greater rangeability for the valve. The cardioid channels or grooves also obviate the otherwise shallow meniscus type opening between the lips 28 & 29 of the through-passageway and the edge of the hole 18 of the ball mounting and sealing rings 15 and/or 16 as the opening between such lip or lips and the hole or holes 18 gradually decreases during the closing or down-throttling of the valve.

Another advantage of the double cardioid glass or double notched ball-valve construction lies in its obviating the otherwise undesirable turning characteristic of ordinary ball-valves. Under conditions of high-fluid velocity, there is a tendency in conventional ball-valves for the momentum of the high-velocity flowing stream to rotate the ball toward the closing direction, to complete closure, unless prevented by mechanical means. In the double cardioid ball-valve or double notched construction hereof, this tendency to rotate does not occur at high velocities of flow and no mechanical precautions are required to preclude such rotation.

The embodiment indicated in FIGS. 5, 6 & 7 is similar to the embodiment shown in FIGS. 1 to 4, and differs therefrom in that the through-passageway 14B of the valve-ball 13-B of the embodiment of FIGS. 5, 6 & 7 is open on one side. The cardioid-shaped or V-shaped notch 30 extends across the lip 28 of the passageway 14B and permits the fine-incremental throttling or control of the flow when the valve-ball is near its closed position;- this notch 30 likewise straddling the diametral plane of the valve-ball which is at a right angle to its axis of rotation.

In the embodiment shown in FIGS. 8 & 9, the through-passage 14C in the valve-ball 13-C has a polygonal cross-section, as, for instance, square cross-section or has a cross-section of a parallelogram, with the apex-lines 32 & 33 of opposite pairs of side-walls 34 & 35 being in the aforementioned diametral plane of the valve-ball 13 which is at a right angle to its axis of rotation X—X.

Instead of being planar however, the side-walls 34 & 35 may be convexly curved as indicated by solid lines in FIG. 8 or may be concavely curved as indicated by dotted or broken lines in FIG. 8, so as to present cardioid-shaped or curved V-shaped lips or intersecting flow-affecting edges 36 to the edges of the inlet and outlet openings 18 in the ball sealing and mounting rings 15 & 16 as the valve-ball 13 approaches its closed position, thereby again providing fine-incremental throttling in the lower flow ranges of the valve and preventing or minimizing clogging or obstructing the closing of the valve with fluid-entrained solid particles and generally providing greater rangeability.

Each facing pair of side-walls 34 & 35 present (to the circular edges of the holes 18 in the sealing-rings 15 & 16) correspondingly shaped intersecting flow-affecting edges 36 at the ends of the through-passageway, whose intersection is in the aforementioned diametral plane of the valve-ball 13-C. Such intersecting edges 36 affect the flow in a manner similar to that of the notches 31 & 31.

Instead of having the pairs of side-walls 34 & 35 formed as continuous surfaces, of which the terminal portions 36 intersect at 32 and 33, the portions of said walls 34 and 35 inwardly of the terminal portions 36 thereof may be cylindrical. Thus, the through-passageway 14C may be generally or in the main of cylindrical cross-section, with only small diametrically opposite through-channels 36 extending radially outwardly therefrom. The surfaces of such through-channels 36 may be of any of the forms indicated in FIGS. 8 or described above. The intersections 32 & 33 between the side-walls 34 & 35 or between the corresponding through-channels 36 extend outwardly and form an otherwise cylindrical through-passageway, which may be slightly filleted.

The embodiment indicated in FIGS. 10 & 11 is the same as the embodiment shown in or described above in respect to FIGS. 8 & 9, excepting only that the through-passageway 14D of the valve-ball 13-D of the embodiment of FIGS. 10 & 11 is open on one side. As in the embodiment illustrated in FIGS. 8 & 9, so in the embodiment illustrated in FIGS. 10 & 11, the side-walls 34 & 35 may be convexly curved as indicated in solid lines in FIG. 8 or they may be concavely curved as illustrated in dotted or broken lines in FIG. 8. The side-walls 34 & 35 present cardioid-shaped edges or curved V-shaped lips 36 to the edge of the inlet or outlet openings 18 in the ball sealing and mounting rings 15 or 16 as the valve-ball 13-D approaches its closed position.

Due to the lack of any tendency for the valve-ball to rotate under the influence of high-velocity flow, the ball valves of the present invention are eminently suitable for use as on-off valves and for use as manually-operated flow-control valves. Due to its extended rangeability and sensitivity, the ball-valves of the present invention may also be power-operated both for on-off uses as well as for incremental flow-control or for flow regulation, by operatively connecting the handle 76 thereof to any suitable pneumatically or electrically powered valve-actuator which may turn the handle 76 and hence the valve-stem 3 and the valve-ball (13-A, 13-B, 13-C & 13-D) directly to an "on" position or to an "off" position or which may turn said valve-ball incrementally either in its flow-increasing or in its flow-decreasing direction responsive to pneumatic or electrical signals determined by any suitable sensors which may sense the temperature, pressure, flow-rate, pH or other process conditions or parameters.

I may also form the valve-housing 1 and the valve-ball (13-A, 13-B, 13-C & 13-D) of metal, and I may also glass-line such metallic valve-housing and may glass-coat such metallic valve-ball.

The leading edge or edges of the passageway (14A, 14B, 14C, 14D) of the valve-ball (13-A, 13B, 13C & 13-D) may be formed to a knife-shape, so as to produce a shearing action when moved past the sealing-rings 15 and/or 16 towards the closed position of the valve-ball, so as to cut any fibrous or soft material which may be entrained in the fluid. Such shearing action is provided for by having the terminal portions 36 of the side-walls 34 & 35 of the through-passageways (14C or 14D) intersect the outer spherical surface with the valve-ball (13-C & 13-D) in a sharp edge, as indicated in FIGS. 8 & 10.

As used in the following claims, the word "glass" is intended to comprehend the so characterized member whether formed of or lined with glass or other essentially vitreous material or a ceramic material or a glass-ceramic composite.

The valve-housing 1 and the valve-ball (13-A, 13-B, 13-C & 13-D) are preferably made of tempered glass, and preferably of tempered boro-silicate glass.

Having shown and described embodiments of my invention, I claim the following.

1. A ball-valve including a valve-housing having a valve-chamber therein and an inlet thereto and an outlet therefrom opposite each other, a generally U-shaped valve-ball in said valve-chamber, the U shape of said valve-ball being formed by a channel therethrough which extends thereinto beyond the axis thereof, said U-shaped valve-ball being supported in said valve-chamber out of contact with the walls thereof only by the below-described circular ball mounting and sealing rings and arranged to rotate about an axis at a right angle to the plane in which the axes of said inlet and outlet lie, said channel in said valve-ball forming a fluid passageway extending therethrough, said passageway being generally U-shaped in cross-section in a plane at a right angle thereto and in which its axis of rotation lies and being open on one side thereof to give the valve-ball its U shape, and the ends of said U-shaped fluid passageway operatively registering with said inlet and outlet, respectively, when the valve-ball is in its fully open position, the outer surfaces of the legs of the U of said valve-ball being spherical segments of the outer shperical surface of the valve-ball co-axial with its axis of rotation, said valve-ball being rotatably supported within said valve-chamber without contact with the walls thereof by the two below-described circular ball-mounting sealing-rings mounted in the valve-housing in operative juxtaposition to said inlet and outlet, respectively, and each of said ball-mounting sealing-rings supportingly contacting the outer spherical surface of the valve-ball in its fully open position along a continuous annulus-shaped area which is substantially more than a half circle and the downstream ball-supporting sealing-ring supportingly contacting the outer spherical surface of the valve-ball in its fully closed position along a full-circular annulus-shaped area and the upstream ball-mounting sealing-ring supportingly contacting the outer spherical surfaces of the free ends of the legs of the U of the valve-ball in its fully closed position along two separated concentric and diametrically opposite annulus-shaped areas, one above and one below the median plane between the legs of the U, and intersecting flow-affecting edges at an end of said generally U-shaped through passageway of said valve-ball, said intersecting flow-affecting edges being generally disposed in proximity of the diametral plane of the valve-ball which is generally at a right angle to its axis of rotation and in which the axes of the inlet and outlet lie, the intersection of said flow-affecting edges being outside a full-circular annulus-shaped sealing-contact area between said spherical surface and the ball-mounting sealing ring when the valve-ball is in its closed position, whereby there will be no flow past said interesecting edges when the valve-ball is in its fully closed position.

2. A ball valve according to claim 1, having a glass valve-housing and a glass valve-ball.

3. A ball valve according to claim 1, in which the intersecting flow-affecting edges at the end of the passageway are disposed generally in a V-shape.

4. A ball valve according to claim 1, in which the intersecting flow-affecting edges at the end of the passageway are convexly curved.

5. A ball valve according to claim 1, in which the intersecting flow-affecting edges at the end of the passageway are concavely curved.

6. A ball valve according to claim 1, in which the intersecting flow-affecting edges at the end of the passageway are cardioid-shaped.

7. A valve-ball according to claim 1 in which the valve-housing is tubular and has a generally cylindrical bore constituting the valve-chamber therein and in which there are two stationary end-members at and extending transversely across the ends of such valve-housing and constituting closures at the ends of said valve-housing constituting the ends of the valve-chamber, at least one of which end-members being detachably secured to the valve-housing, and in which such two end-members press the ball mounting and sealing rings against the valve-ball.

8. A ball-valve including a valve-housing having a valve-chamber therein and an inlet thereto and an outlet therefrom opposite each other, a generally U-shaped valve-ball in said valve-chamber, the U shape of said valve-ball being formed by a channel therethrough which extends thereinto beyond the axis thereof, said U-shaped valve-ball being arranged to rotate about an axis at a right angle to the plane in which the axes of said inlet and outlet lie, said channel in said valve-ball forming a fluid passageway extending therethrough, said passageway being generally U-shaped in cross-section in a plane at a right angle thereto and in which its axis of rotation lies and being open on one side thereof to give the valve-ball its U-shape, and the ends thereof operatively registering with said inlet and outlet, respectively, when the valve-ball is in its fully open position, the outer surfaces of the legs of the U of said valve-ball being spherical segments of the outer spherical surface and the valve-ball co-axial with its axis of rotation, said valve-ball being rotatably supported within said valve-chamber without contact with the walls thereof by the two below-described circular ball-mounting sealing-rings mounted in the valve-housing in operative juxtaposition to said inlet and outlet, respectively, each of said ball-mounting sealing-rings supportingly contacting the outer spherical surface of the valve-ball in its fully open position along a continuous annulus-shaped area which is substantially more than a half circle and the downstream ball-supporting sealing-ring supportingly contacting the outer spherical surface of the valve-ball in its fully closed position along a full-circular annulus-shaped area and the upstream ball-mounting sealing-ring supportingly contacting the outer spherical surfaces of the free ends of the legs of the U of the valve-ball in its fully closed position along two separated concentric and diametrically opposite annulus-shaped areas, one above and one below the median plane between the legs of the U, and a flow-affecting notch across a lip at an end of said generally U-shaped through passageway of said valve-ball and extending radially outwardly from said passageway, said notch being generally disposed in proximity of the diametral plane of the valve-ball which is generally at a right angle to its axis of rotation and in which the axes of the inlet and outlet lie, the end of said notch which is in the spherical surface of the valve-ball being outside the full-circular annulus-shaped sealing-contact area between said spherical surface and the ball-mounting sealing-ring when the valve ball is in its closed position.

9. A ball valve according to claim 8, having a glass valve-housing and a glass valve-ball.

10. A ball valve according to claim 8, in which the flow-affecting notch is V shaped.

11. A ball valve according to claim 8, in which the flow-affecting notch is cardioid shaped.

12. A valve ball according to claim 8 in which the valve housing is tubular and has a generally cylindrical bore constituting the valve-chamber therein and in which there are two stationary end-members at and extending transversely across the ends of such valve-housing and constituting closures at the ends of said valve-housing constituting the ends of the valve-chamber, at least one of which end-members being detachably secured to the valve-housing, and in which such two end-members press the ball mounting and sealing rings against the valve-ball.

13. A ball-valve including a valve-housing having a valve-chamber therein and an inlet thereto and an outlet therefrom opposite each other, a generally U-shaped valve-ball rotatably supported in said valve-chamber, the U shape of said valve-ball being formed by a channel therethrough which extends thereinto beyond the axis thereof, said U-shaped valve-ball being arranged to rotate about an axis at a right angle to the plane in which the axes of said inlet and outlet lie, said channel in said valve-ball forming a fluid passageway extending therethrough, said passageway being generally U-shaped in cross-section in a plane at a right angle thereto and in which its axis of rotation lies and being open on one side thereof to give the valve-ball its U shape, and the ends thereof operatively registering with said inlet and outlet, respectively, when the valve-ball is in its fully open position, the outer surfaces of the legs of the U of said valve-ball being spherical segments of the outer spherical surface of the valve-ball co-axial with its axis of rotation, and two circular ball-sealing rings mounted in the valve-housing in operative juxtaposition to said inlet and outlet, respectively, each of said ball-sealing rings contacting a spherical surface of the valve-ball in its fully open position along a continuous annulus-shaped area which is substantially more than a half circle and the downstream ball-sealing ring contacting the spherical surface of the valve-ball in its fully closed position along a full-circular annulus-shaped area and the upstream ball-sealing ring contacting the outer spherical surfaces of the free ends of the legs of the U of the valve-ball in its fully closed position along two separated concentric and diametrically opposite annulus-shaped areas, one above and one below the median plane between the legs of the U.

14. A ball-valve according to claim 13, having a glass valve-housing and a glass valve-ball.

15. A valve-ball according to claim 14 in which the valve-housing is tubular and has a generally cylindrical bore constituting the valve-chamber therein and in which there are two stationary end-members at and extending transversely across the ends of such valve-housing and constituting closures at the ends of said valve-housing constituting the ends of the valve-chambers, at least one of which end-members being detachably secured to the valve-housing, and in which such two end-members press the ball mounting and sealing rings against the valve-ball.

16. A valve-ball according to claim 13 in which the valve-housing is tubular and has a generally cylindrical bore constituting the valve-chamber therein and in which there are two stationary end-members at and extending transversely across the ends of such valve-housing and constituting closures at the ends of said valve-housing constituting the ends of the valve-chambers, at least one of which end-members being detachably secured to the valve-housing, and in which such two end-members press the ball mounting and sealing rings against the valve-ball.

* * * * *